United States Patent

Murrell

Patent Number: 5,896,668
Date of Patent: Apr. 27, 1999

[54] BARBECUE FORK

[76] Inventor: David L. Murrell, 8004 Wynewood Dr., Raleigh, N.C. 27616-5614

[21] Appl. No.: 09/074,087

[22] Filed: May 7, 1998

[51] Int. Cl.$^6$ ..................................................... A47J 43/28
[52] U.S. Cl. .................................. 30/322; 294/26; 30/340
[58] Field of Search ............................. 30/322, 123, 142, 30/340; 294/26; D7/653, 683

[56] References Cited

U.S. PATENT DOCUMENTS

| | | | |
|---|---|---|---|
| 983,763 | 2/1911 | Potter et al. ................................ | 30/340 |
| 2,604,350 | 7/1952 | Taylor ......................................... | 30/322 |
| 2,607,988 | 8/1952 | Williams ..................................... | 30/322 |
| 3,162,475 | 12/1964 | Van Allen .................................. | 30/322 |
| 4,332,409 | 6/1982 | Stachowicz ............................... | 30/322 |
| 4,734,984 | 4/1988 | Snell et al. ................................ | 30/322 |
| 5,813,120 | 9/1998 | Stroh ......................................... | 30/322 |

*Primary Examiner*—Hwei-Siu Payer

[57] ABSTRACT

A new barbecue fork for lifting and turning food stuffs on a cooking surface. The inventive device includes an elongate shaft and a handle. The proximal end of the shaft is coupled to the first end of the handle. A pair of spaced apart hooked-shaped prongs are coupled to the shaft with the prongs located towards the distal end of the shaft.

1 Claim, 2 Drawing Sheets

BARBECUE FORK

BACKGROUND OF THE INVENTION

1. Field of the Invention

The present invention relates to barbecue cooking utensils and more particularly pertains to a new barbecue fork for lifting and turning food stuffs on a cooking surface.

2. Description of the Prior Art

The use of barbecue cooking utensils is known in the prior art. More specifically, barbecue cooking utensils heretofore devised and utilized are known to consist basically of familiar, expected and obvious structural configurations, notwithstanding the myriad of designs encompassed by the crowded prior art which have been developed for the fulfillment of countless objectives and requirements.

Known prior art barbecue cooking utensils include U.S. Pat. No. 4,844,525; U.S. Pat. No. 4,338,721; U.S. Pat. No. Des. 351,092; U.S. Pat. No. 5,206,998; U.S. Pat. No. Des. 299,997; and U.S. Pat. No. 4,539,751.

While these devices fulfill their respective, particular objectives and requirements, the aforementioned patents do not disclose a new barbecue fork. The inventive device includes an elongate shaft and a handle. The proximal end of the shaft is coupled to the first end of the handle. A pair of spaced apart hooked-shaped prongs are coupled to the shaft with the prongs located towards the distal end of the shaft.

In these respects, the barbecue fork according to the present invention substantially departs from the conventional concepts and designs of the prior art, and in so doing provides an apparatus primarily developed for the purpose of lifting and turning food stuffs on a cooking surface.

SUMMARY OF THE INVENTION

In view of the foregoing disadvantages inherent in the known types of barbecue cooking utensils now present in the prior art, the present invention provides a new barbecue fork construction wherein the same can be utilized for lifting and turning food stuffs on a cooking surface.

The general purpose of the present invention, which will be described subsequently in greater detail, is to provide a new barbecue fork apparatus and method which has many of the advantages of the barbecue cooking utensils mentioned heretofore and many novel features that result in a new barbecue fork which is not anticipated, rendered obvious, suggested, or even implied by any of the prior art barbecue cooking utensils, either alone or in any combination thereof.

To attain this, the present invention generally comprises an elongate shaft and a handle. The proximal end of the shaft is coupled to the first end of the handle. A pair of spaced apart hooked-shaped prongs are coupled to the shaft with the prongs located towards the distal end of the shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new barbecue fork apparatus and method which has many of the advantages of the barbecue cooking utensils mentioned heretofore and many novel features that result in a new barbecue fork which is not anticipated, rendered obvious, suggested, or even implied by any of the prior art barbecue cooking utensils, either alone or in any combination thereof.

It is another object of the present invention to provide a new barbecue fork which may be easily and efficiently manufactured and marketed.

It is a further object of the present invention to provide a new barbecue fork which is of a durable and reliable construction.

An even further object of the present invention is to provide a new barbecue fork which is susceptible of a low cost of manufacture with regard to both materials and labor, and which accordingly is then susceptible of low prices of sale to the consuming public, thereby making such barbecue fork economically available to the buying public.

Still yet another object of the present invention is to provide a new barbecue fork which provides in the apparatuses and methods of the prior art some of the advantages thereof, while simultaneously overcoming some of the disadvantages normally associated therewith.

Still another object of the present invention is to provide a new barbecue fork for lifting and turning food stuffs on a cooking surface.

Yet another object of the present invention is to provide a new barbecue fork which includes an elongate shaft and a handle. The proximal end of the shaft is coupled to the first end of the handle. A pair of spaced apart hooked-shaped prongs are coupled to the shaft with the prongs located towards the distal end of the shaft.

Still yet another object of the present invention is to provide a new barbecue fork that has a pair of hooked tines that hook food items to secure the food on the tines so that the food does not fall off of the fork when lifted off a cooking surface.

Even still another object of the present invention is to provide a new barbecue fork that is strong enough to securely pick up a rack of ribs, a whole chicken and a half side of a forty pound pig without dropping or bending.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
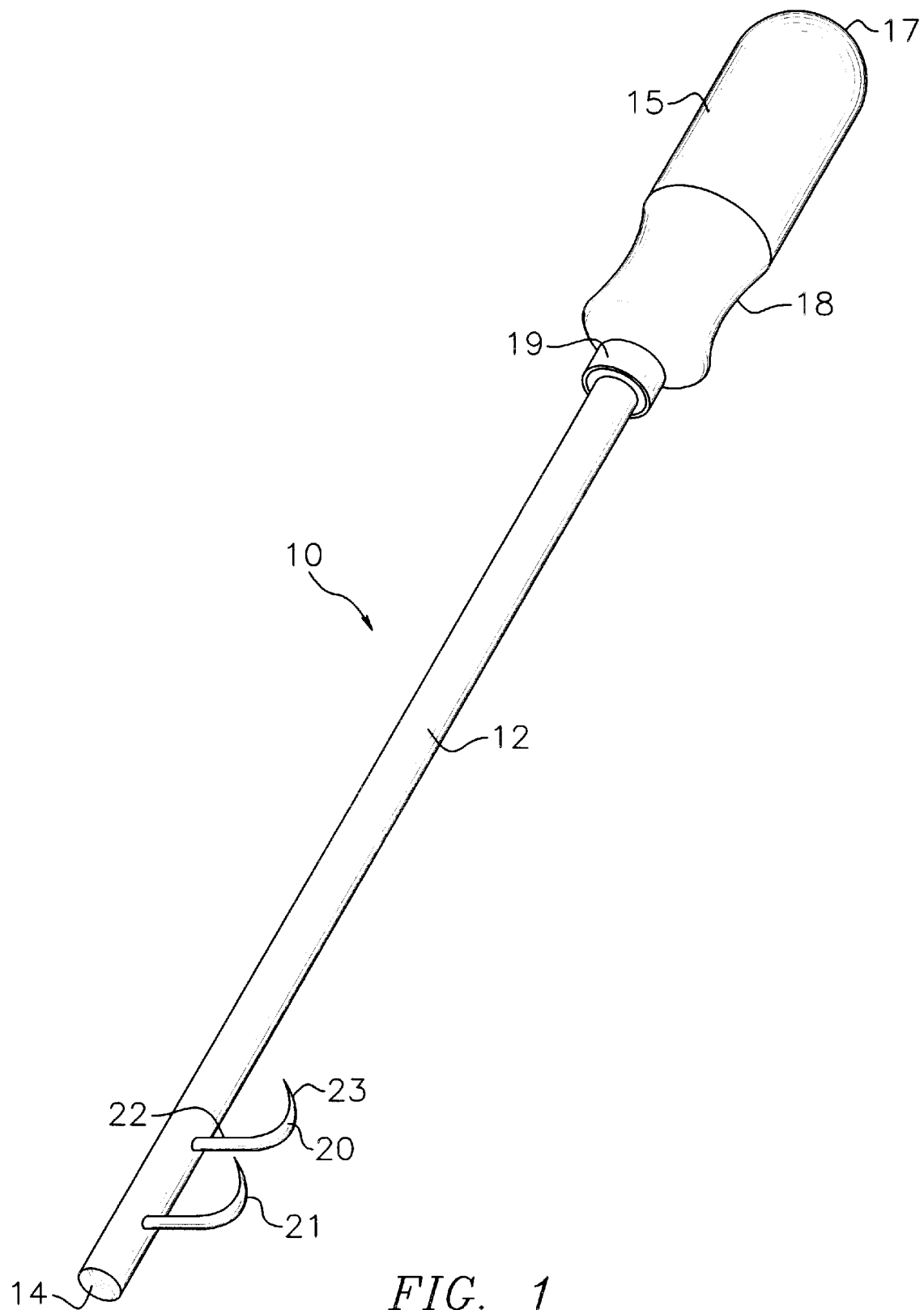
FIG. 1 is a schematic perspective view of a new barbecue fork according to the present invention.
Figure 2:
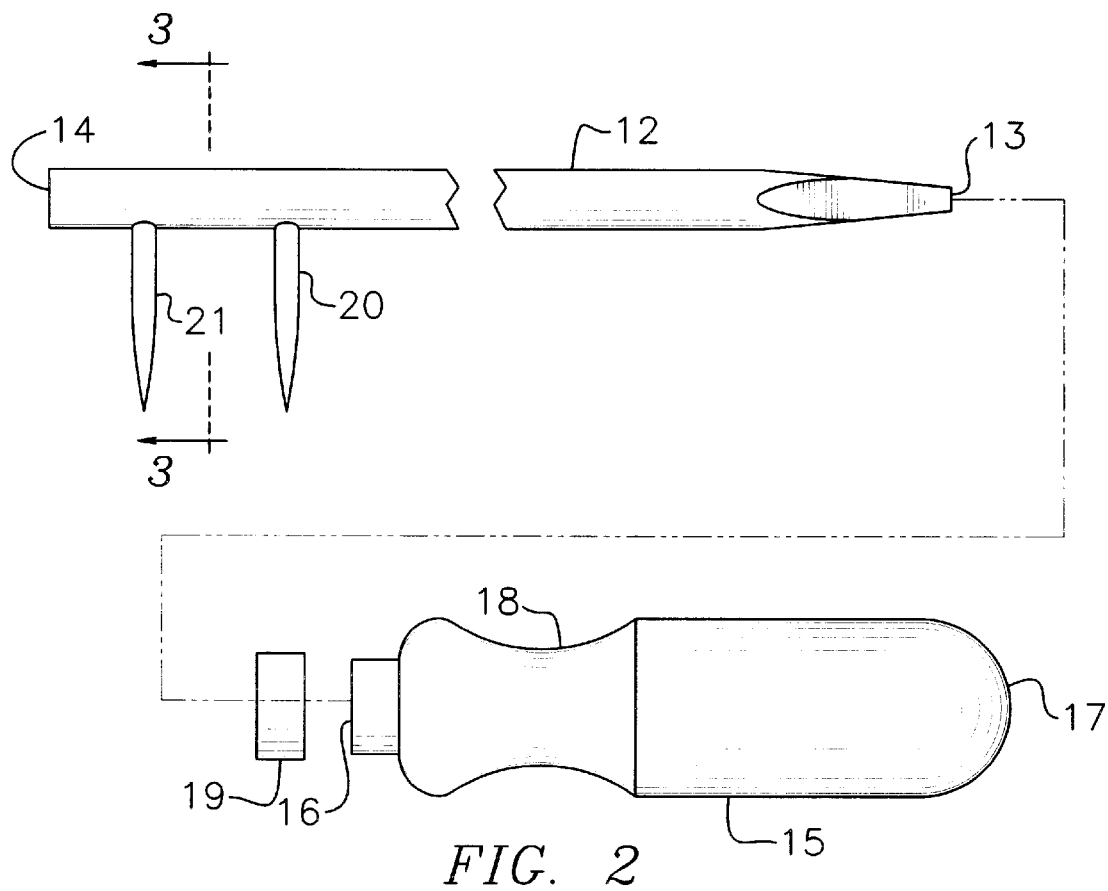
FIG. 2 is a schematic exploded side view of the present invention.
Figure 3:
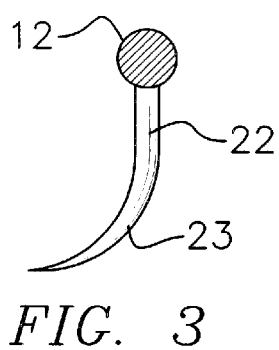
FIG. 3 is a schematic sectional view of the present invention as seen from line 3—3 of FIG. 2.

With reference now to the drawings, and in particular to FIGS. 1 through 3 thereof, a new barbecue fork embodying the principles and concepts of the present invention and generally designated by the reference numeral 10 will be described.

As best illustrated in FIGS. 1 through 3, the barbecue fork 10 generally comprises an elongate shaft 12 and a handle 15. The proximal end 13 of the shaft 12 is coupled to the first end 16 of the handle 15. A pair of spaced apart hooked-shaped prongs 20, 21 are coupled to the shaft 12 with the prongs 20, 21 located towards the distal end 14 of the shaft 12.

In closer detail, the elongate shaft 12 is generally cylindrical and has opposite proximal and distal ends 13, 14, with the longitudinal axis extending through the ends of the shaft 12. Preferably, the proximal end 13 of the shaft 12 is tapered to a squared tip. The shaft 12 has a length defined between the ends of the shaft 12. Preferably, the length of the shaft 12 is greater than about 8 inches. Ideally, the length of the shaft 12 is about 20 inches so that the overall length of the utensil 10 is about 23 inches.

The handle 15 is generally cylindrical and has first and second ends 16, 17. Preferably, the handle 15 has an annular finger groove 18 therearound positioned adjacent the first end 16 of the handle 15. Ideally, the annular finger groove 18 has a width less than about one half the length of the handle 15.

The proximal end 13 of the shaft 12 is coupled to the first end 16 of the handle 15. In closer detail, the proximal end 13 of the shaft 12 is inserted into the first end 16 of the handle 15 with a clamp 19 holding the proximal end 13 of the shaft 12 to the first end 16 of the handle 15. Preferably, the clamp 19 comprises a ring clamp disposed around the shaft 12.

The pair of spaced apart hooked-shaped prongs 20, 21 are coupled to the shaft 12 towards the distal end 14 of the shaft 12. An endmost one 21 of the prongs 20, 21 is spaced from the distal end 14 of the shaft 12 a distance less than a distance between the prongs 20,21. The prongs 20, 21 are preferably generally parallel to each other and each prong 20, 21 has a generally straight portion 22 and an arcuate portion 23 which terminates at a point. The straight portions 22 of the prongs 20, 21 are extended in a direction substantially perpendicular to the longitudinal axis of the shaft 12. The arcuate portions 23 curving towards a direction generally perpendicular to the straight portions 22 and the longitudinal axis of the shaft 12. The straight portions 22 each have a predetermined diameter less than that of the shaft 12.

In use, the barbecue fork 10 is used for lifting and turning food on a cooking surface such as a barbecue grill. The prongs are inserted into the food so that the food is hooked onto the prongs. The food may now be lifted and turned without of the food falling off of the prongs.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking utensil, comprising:

an elongate shaft being generally cylindrical and having opposite proximal and distal ends, and a longitudinal axis extending through said ends of said shaft;

said proximal end of said shaft being tapered to a squared tip;

said shaft having a length defined between said ends of said shaft, wherein said length of said shaft is about 20 inches such that a total length of the utensil is about 23 inches;

a handle being generally cylindrical and having first and second ends, said handle having a length and an annular finger groove therearound, said annular finger groove being positioned adjacent said first end of said handle, wherein said annular finger groove has a width less than about one half said length of said handle;

said proximal end of said shaft being coupled to said first end of said handle, wherein said proximal end of said shaft is inserted into said first end of said handle, wherein a clamp holds said proximal end of said shaft to said first end of said handle, wherein said clamp comprises a ring clamp disposed around said shaft;

a pair of spaced apart hooked-shaped prongs being coupled to said shaft, said prongs being located towards said distal end of said shaft, wherein an endmost one of said prongs is spaced from said distal end of said shaft a distance less than a distance between said prongs;

said prongs being generally parallel to each other;

each of said prongs having a linear straight portion and an arcuate portion tapering so as to terminate at a point;

said straight portions of said prongs being extended in a direction substantially perpendicular to said longitudinal axis of said shaft, wherein said straight portions each have a diameter less than that of said shaft; and said points of said arcuate portions curving towards a direction generally perpendicular to said straight portions of said prongs and said longitudinal axis of said shaft.

* * * * *